United States Patent [19]

Wesselink et al.

[11] 4,181,155
[45] Jan. 1, 1980

[54] PRESSURE ENERGY ACCUMULATOR

[75] Inventors: Gustaaf A. Wesselink; Adrianus J. J. Franken; Hendricus F. G. Smulders, all of Eindhoven, Netherlands

[73] Assignee: U.S. Philips Corporation, New York, N.Y.

[21] Appl. No.: 915,130

[22] Filed: Jun. 13, 1978

[30] Foreign Application Priority Data

Jun. 13, 1977 [NL] Netherlands ............. 7706448

[51] Int. Cl.² ................................ F16L 55/02
[52] U.S. Cl. ....................................... 138/30
[58] Field of Search ............... 138/30, 31, 26; 252/372

[56] References Cited

U.S. PATENT DOCUMENTS

| 3,023,786 | 3/1962 | Taylor | 138/31 |
| 4,077,100 | 5/1978 | Zahid | 138/30 |

Primary Examiner—Lenard A. Footland
Attorney, Agent, or Firm—Rolf E. Schneider

[57] ABSTRACT

A pressure energy accumulator having a mixture consisting of $CF_4$ or $C_2F_6$ and $N_2$, $H_2$, or He, or a combination thereof, as the gaseous working medium.

1 Claim, 2 Drawing Figures

PRESSURE ENERGY ACCUMULATOR

This invention relates to a pressure energy accumulator comprising a reservoir containing a gaseous working medium and having a movable wall via which the gaseous working medium can be compressed.

From the article "Regenerative braking system could cut fuel consumption" (Automotive Engineering, Vol., 84, No. 5, May 1976, pp. 12-13) it is known to store the kinetic energy which is lost normally upon braking a vehicle, via a hydraulic liquid in such an accumulator by compression of the gaseous working medium. Said stored energy is afterwards used to set the vehicle in motion again or to accelerate it.

The pressure energy accumulator may alternatively be used as an auxiliary energy source upon braking a vehicle the engine of which has already been shut off or the engine of which has stalled ("power brake booster"). Application is possible in addition in lift cages and the like with their many decelerations and accelerations.

In such known pressure energy accumulator the reservoir is filled with nitrogen gas and the movable wall is a diaphragm.

Upon compression of the nitrogen gas the applied kinetic energy is converted into calorific energy, which is expressed in a strong rise in temperature of the nitrogen gas (substantially adiabatic compression). The calorific energy is partly lost to the atmosphere by heat leakage.

It is the object of the present invention to provide a pressure energy accumulator having an improved energy storage.

For that purpose the pressure energy accumulator according to the invention is characterized in that the gaseous working medium consists at least substantially entirely of a mixture of:

$CF_4$ and $N_2$ having at least 5 and at most 80 mol % $N_2$;

$CF_4$ and $H_2$ having at least 5 and at most 85 mol% $H_2$;

$CF_4$ and He having at least 5 and at most 85 mol% He;

$C_2F_6$ and $N_2$ having at least 40 and at most 90 mol% $N_2$;

$C_2F_6$ and $H_2$ having at least 20 and at most 90 mol% $H_2$;

$C_2F_6$ and He having at least 20 and at most 90 mol% He, or a combination thereof.

The invention will now be described in greater detail in connection with the accompanying drawing, in which.

Figure 1A:
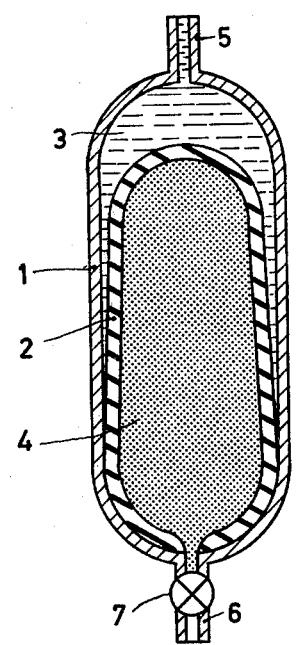
FIG. 1a shows in longitudinal section a pressure-energy accumulator in a minimum charge condition.
Figure 1B:
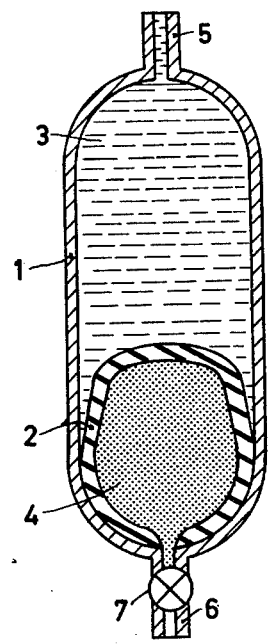
FIG. 1b shows the accumulator according to FIG. 1a in a maximum charge condition.

Reference numeral 1 denotes a cylindrical reservoir provided with a movable flexible partition 2, e.g., a rubber or plastic diaphragm, which separates a hydraulic liquid 3, e.g., oil, from gaseous working medium 4. The hydraulic liquid 3 is supplied to and withdrawn from the reservoir via a duct 5, which communicates with a hydraulic system (not shown). The gaseous working medium 4 can be introduced into the reservoir 1 via a duct 6, in which a valve 7 is incorporated which, after filling, remains in a closed condition.

The energy accumulator according to the invention has the great advantage that upon compressing the gaseous medium a lower rise in temperature of said working gaseous occurs. As a result of this, less energy per unit time is lost to the atmosphere by leakage from the reservoir. In addition, due to the lower operating temperature, the movable wall may be made of a synthetic resin.

The invention is based on the recognition that optimum energy storage (that is a quantity of stored energy which is as large as possible with a minimum possible final pressure and final temperature after compression of the gaseous working medium) is possible by a compromise between on the one hand the largest possible specific heat $C_V$ of the gas molecules and on the other hand as small as possible attraction forces between the gas molecules (van der Waals forces).

In principle the gas mixtures according to the invention are therefore composed of a gas having a large specific heat $C_V$ and a gas having a low intermolecular attraction.

The indicated binary mixtures of tetrafluoromethane ($CF_4$) with nitrogen, hydrogen and helium, respectively, may be combined mutually to 3- or 4-component mixtures.

The indicated binary mixtures of hexafluoroethane ($C_2F_6$) with nitrogen, hydrogen and helium, respectively, may also be combined mutually to 3- or 4-component mixtures.

The two above-mentioned groups of binary mixtures can be combined to 3-, 4- or 5- component mixtures.

What is claimed is:

1. A pressure energy accumulator comprising a reservoir containing a hydraulic liquid and a gaseous working medium separated by a movable flexible partition to permit the gaseous working medium to be compressed, said gaseous working medium consisting at least substantially entirely of a mixture of:

$CF_4$ and $N_2$ having a least 5 and at most 80 mol% $N_2$;

$CF_4$ and $H_2$ having at least 5 and at most 85 mol% $H_2$;

$CF_4$ and He having at least 5 and at most 85 mol% He;

$C_2F_6$ and $N_2$ having at least 40 and at most 90 mol% $N_2$;

$C_2F_6$ and $H_2$ having at least 20 and at most 90 mol% $H_2$;

$C_2F_6$ and He having at least 20 and at most 90 mol% He; or a combination thereof.

* * * * *